US007089490B1

(12) United States Patent
Tan et al.

(10) Patent No.: US 7,089,490 B1
(45) Date of Patent: Aug. 8, 2006

(54) IDENTIFYING NAVIGATION BARS AND OBJECTIONABLE NAVIGATION BARS

(75) Inventors: Chade-Meng Tan, Cupertino, CA (US); Daniel Dulitz, Palo Alto, CA (US)

(73) Assignee: Google, Inc., Mountain View, CA (US)

( * ) Notice: Subject to any disclaimer, the term of this patent is extended or adjusted under 35 U.S.C. 154(b) by 648 days.

(21) Appl. No.: 09/727,212

(22) Filed: Nov. 30, 2000

(51) Int. Cl.
G06F 17/21 (2006.01)
G06F 17/27 (2006.01)
G06F 17/24 (2006.01)

(52) U.S. Cl. ............... 715/514; 715/513; 715/515; 715/520; 715/539; 709/224; 709/229

(58) Field of Classification Search ........ 715/513–515, 715/517, 520, 539, 500, 501.1; 709/224, 709/229, 217–219
See application file for complete search history.

(56) References Cited

U.S. PATENT DOCUMENTS

| 5,978,818 | A  | * | 11/1999 | Lin ........................ 715/501.1 |
| 6,144,962 | A  | * | 11/2000 | Weinberg et al. ............ 707/10 |
| 6,266,664 | B1 | * | 7/2001  | Russell-Falla et al. ......... 707/5 |
| 6,344,851 | B1 | * | 2/2002  | Roberts et al. ............. 345/418 |
| 6,430,624 | B1 | * | 8/2002  | Jamtgaard et al. .......... 709/246 |
| 6,601,100 | B1 | * | 7/2003  | Lee et al. .................. 709/226 |
| 2002/0032694 | A1 | * | 3/2002 | Zawadzki et al. .......... 707/500 |
| 2002/0062302 | A1 | * | 5/2002 | Oosta ............................. 707/1 |
| 2002/0099561 | A1 | * | 7/2002 | Wilkins et al. ................ 705/1 |

OTHER PUBLICATIONS

Mr. Cluey, How Can I find out how many hyperlinks there are on a page?, Sep. 10, 2000, <http://www.sqa-test.com/mr_cluey/countlinks.html>.*

(Continued)

*Primary Examiner*—Stephen Hong
*Assistant Examiner*—Joshua D Campbell
(74) *Attorney, Agent, or Firm*—Straub & Pokotylo; John C. Pokotylo

(57) ABSTRACT

Detecting so-called "navigation bars" (or "nav bars") in a (Web) document by determining whether or not nodes of a parse tree of the (Web) document are "anchor-heavy". Generally, a navigation bar can be thought of as text, such as a hyper-text link or anchor text for example, without any immediate content. Once a navigation bar is detected, objectionable navigation bars (i.e., navigation bars, the rendering of which would be objectionable to users without special re-authoring), can be distinguished from non-objectionable navigation bars (i.e., navigation bars which would not be objectionable to users with no special re-authoring). Objectionable navigation bars may be distinguished from non-objectionable navigation bars by: (a) determining whether the navigation bar is so small that normal rendering would not be objectionable; (b) determining whether the navigation bar presumably conveys meaningful content; and/or (c) determining whether the navigation bar is a component of a non-objectionable navigation bar (where all components of the non-objectionable navigation bar are navigation bars themselves).

28 Claims, 15 Drawing Sheets

OTHER PUBLICATIONS

Timothy W. Bickmore and Bill N. Schilit, "Digestor: Device-independent Access to the World Wide Web", *Proc. of the Sixth World Wide Web Conference* (Downloaded from http://decweb.ethz.ch/WWW6/Technical/Paper177/Paper177.html on Mar. 24, 2000, pp. 1-10).

Alfred V. Aho, Ravi Sethi, and Jerffrey D. Ullman, "Compilers Principles, Techniques, and Tools." Mar. 1988, pp. 29-82, and pp. 169-278.

* cited by examiner

FIGURE 6A

SF Gate: Traffic: Live traffic reports, articles and information
----------
[SF Gate]
[(link)] [(traffic)]
[SF Gate Home]⎫
[Today's News]   ⎪
[Sports]          ⎬ 610b
[Entertainment]  ⎪
[Business]       ⎪
[Technology]     ⎭
[Traffic]   ⎫
[Weather]   ⎬ 620b
[Live Views]⎭
[Classifieds:]⎫
[Rentals]      ⎪
[Homes]        ⎬ 630b
[Autos]        ⎪
[Jobs]         ⎪
[Personals]    ⎭
[Archives]⎫
[Maps]     ⎬ 640b
[Search]  ⎭
[Bay Area Travel]⎫
[Columnists]      ⎪
[Conferences]     ⎪
[Food]            ⎪
[Gay & Lesbian]   ⎬ 650b
[Health]          ⎪
[Home & Garden]   ⎪
[Horoscope]       ⎪
[Lottery]         ⎭

```
SF Gate: Traffic: Live traffic reports, articles and information
----------
[NAV; SF.. SF.. Today's...]
[(link)]                                    610c-650c
TRAFFIC & TRANSIT REPORTS
TRANSIT SCHEDULES & MAPS
[(www.kron.com)]
Wednesday, October 18 05:39PM PDT 2000
(updated every 10 min)
ON THE BRIDGES
[Back to top]
Bay Bridge
NO INCIDENTS REPORTED
Golden Gate
*SLOW* SOUTHBOUND IS SLOW IN STRETCHES FROM THE NORTH TOWER TO THE
TOLLS. HEAVY FOG IS ACROSS THE SPAN. (UPDATED AT 5:06 pm)
San Mateo
*STALL* EASTBOUND AT THE BOTTOM OF THE HIGHRISE... A CAR BLOCKS THE
RIGHT LANE. (UPDATED AT 5:18 pm)
Dumbarton
NO INCIDENTS REPORTED
Richmond
NO INCIDENTS REPORTED
Carquinez
NO INCIDENTS REPORTED
Benicia
*SLOW* NORTHBOUND IS HEAVY FROM MARINA VISTA TO THE TOLLS. (UPDATED
AT
5:07 pm)
Antioch
NO INCIDENTS REPORTED
ON THE ROADS
[Back to top]
South Bay
(FIRST REPORTED AT 5:04 pm) ACCIDENT IN SAN JOSE, NORTHBOUND 680 PAST
KING
101... A CAR STRUCK THE GUARDRAIL. THE HIGHWAY PATROL IS ON SCENE
CLEARING
THE CRASH. (UPDATED AT 5:26 pm)
Peninsula
(FIRST REPORTED AT 5:07 pm) INJURY ACCIDENT IN SAN MATEO, ON THE
PENINSULA
AVENUE ONRAMP TO NORTHBOUND 101... A MOTORCYCLE CRASH IS ON THE
SHOULDER.
EMERGENCY CREWS ARE ENROUTE.
East Bay
(FIRST REPORTED AT 5:24 pm) ACCIDENT IN WALNUT CREEK, NORTHBOUND 680
BEFORE
NORTH MAIN STREET... TWO CARS BLOCK THE LEFT LANE.
(FIRST REPORTED AT 5:11 pm) ACCIDENT IN BERKELEY, EASTBOUND 80 PAST
ASHBY... A FENDER BENDER IS ON THE SHOULDER, WAITING FOR
THE HIGHWAY PATROL. (UPDATED AT 5:22 pm)
(FIRST REPORTED AT 5:08 pm) ACCIDENT IN RICHMOND, EASTBOUND 80 BEFORE
RICHMOND PARKWAY... FOUR CARS ARE ON THE SHOULDER.

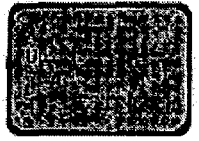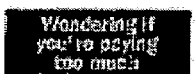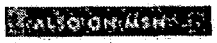
FIGURE 7A Love & Relationships - romance, sex, advice & more
----------
[MSN Home]
[Hotmail]
[Web Search]         ⎫
[Shopping]           ⎬  710b
[Money]              ⎭
[People & Chat]
[go to MSN.com]
[Download Now!]
[Love & Relationships]
Wednesday, October 18, 2000
[Home]
[Single]
[Dating]             ⎫
[Committed]          ⎬  720b
[Crushed]            ⎭
[The Love Shop]
Featured Community
[Rendezvous]         ⎫  730b
[More communities...] ⎭
Featured Chat
Psychic extraordinaire [Laura Gerking], Oct 25, 8pm ET
Adventure can take many forms. Sometimes, following your heart is the greatest one of all
-Dagny Scott
[You go girl!]       ⎫
[Hot vintage cars]   ⎬  740b
[The best of Halloween] ⎭

Love & Relationships - romance, sex, advice & more
----------
[NAV: MSN.. Hotmail.. Web...]
[go to MSN.com]                           —— 710c
[Downloard Now!]
[Love & Relationships]
Wednesday, October 18, 2000
[NAV: Home.. Single.. Dating...]
Featured Community                        —— 720c
[Rendezvous]           ⎤   730c
[More communities....] ⎦   (730b)
Featured Chat
Psychic extraordinaire [Laura Gerking], Oct 25, 8pm ET
Adventure can take many forms. Sometimes, following your heart is the
greatest one of all.
-Dagny Scott
[NAV: .. You.. ...]    —— 740c
[NAV: For.. Healthy.. Love...]
[Quiz: Are you a dangerous flirt?]
[(95love.asp)]
Today's Feature
Haunted by an ex? [Get rid of old relationship ghosts]
(74Hiwire.asp)
[Met your type? Tie your shoes and run like hell!]
Hit the road
[NAV: ... Buck.. ...]
Love News
[Caring for a loved one with cancer]

```
ODP - Open Directory Project
----------
[about dmoz] | [add URL] | [feedback] | [link] | [editor login]
[Arts]
[Movies], Television, Music...
[Business]
[Jobs], [Industries], [Investing...]
[Computers]
[Internet], [Software], [Hardware...]
[Games]
[Video Games], [RPGs], [Gambling...]
[Health]
[Fitness], [Medicine], [Alternative...]

3616
```

IDENTIFYING NAVIGATION BARS AND OBJECTIONABLE NAVIGATION BARS

§ 1. BACKGROUND OF THE INVENTION

§ 1.1 Field of the Invention

The present invention concerns reformatting content. In particular, the present invention concerns reformatting content intended to be rendered on a larger display screen (such as typical 15 inch to 21 inch monitors used with personal computers for example), for rendering on a smaller screen. The present invention also concerns identifying navigation bars in general. Such general navigation bar identification may be useful in other applications, such as for purposes of determining whether or not to index text, or whether or not to show text in a snippet search result, for example.

§ 1.2 Related Art

The description of art in this section is not, and should not be interpreted to be, an admission that such art is prior art to the present invention. The Internet and traditional modes of Internet access are introduced in § 1.2.1 below. The growth of information access via portable (e.g., wireless) devices having smaller display screens, as well as challenges related to such access and rendering, are then introduced in § 1.2.2 below.

§1.2.1 The Internet and Traditional Modes of Internet Access

In recent decades, and starting in the 1990s in particular, computers have become interconnected by networks by an ever increasing extent; initially, via local area networks (or "LANs"), and more recently via LANs, private wide area networks (or "WANs") and the Internet. The proliferation of networks, in conjunction with the increased availability of inexpensive data storage means, has afforded computer users unprecedented access to a wealth of content. Such content may be presented to a user (or "rendered") in the form of text, images, audio, video, etc. Such content is referred to as "documents" or "pages" without loss of generality.

Since the Internet permits many different computers, platforms, and applications to access information, standard "markup languages" have been adopted so that documents retain formatting, indexing, and linking information, without regard to the type of computer, platform, or application supported on the device accessing and rendering the documents. The most common markup languages are briefly introduced below.

Initially, the standard generalized markup language (or "SGML") was adopted by the International Organization for Standardization ("the ISO") in 1986 as a means for providing platform and application independent documents that retain formatting, indexing, and linked information. SGML does so by providing a grammar-like mechanism for users to define the structure of their documents, as well as tags used to denote the structure in individual documents.

The hypertext markup language (or "HTML") is an application of SGML used for documents on the World Wide Web. HTML uses tags to mark elements (such as text and graphics for example) in a document to indicate how Web browsers should display such elements, as well as to indicate how Web browsers should respond to user actions, such as the activation of a link (such as by a mouse click for example).

Finally, the extensible markup language (or "XML") is a condensed form of SGML which lets Web developers and designers create customized tags that offer greater flexibility in organizing and presenting information than is possible with HTML.

§ 1.2.2 The Growth of Content Access Via, and Content Rendering on, Devices with Smaller Display Screens The markup languages introduced above permit Web document authors and designers to format their documents to effectively communicate information to their intended audience. Web document authors and designers often consider many design factors, such as ease of navigation, logical organization, consistency, efficient downloading, etc. The display device on which the intended audience is expected to render such Web documents is a major consideration in the design and authoring of Web sites and Web documents. Traditionally, most access to documents on the World Wide Web has been by means of personal computer, most of which are equipped with 15 inch to 21 inch monitors, and many of which support resolutions of 640-by-480 pixels, and beyond. Accordingly, most documents on the World Wide Web are designed for display on desktop computers with color monitors having at least 640-by-480 resolution.

Internet access and the rendering of Web documents by devices with smaller displays, such as personal electronic devices, cell phones, mobile phones, and other portable and/or untethered information access and communication devices, is rapidly increasing. The wireless markup language (or "WML") has been introduced to facilitate authoring documents for rendering on devices with limited display area, limited memory and processing resources, and lower bandwidth connections.

§ 1.2.2.1 Challenges Related to Reformatting Content for Rendering on Smaller Display Screens The intended audience for many Web sites and Web documents will often include users accessing and rendering such Web sites and web documents with traditional desktop computers having larger displays, as well as users accessing and rendering such Web sites with devices having smaller displays (as well as users who will use both types of devices). Such a heterogeneous audience using various types of devices presents a dilemma for web authors and web designers—how can different intended audiences, using different access and/or rendering devices be satisfied?

The article, T. Bickmore et al., "Digestor: Device-independent Access to the World Wide Web," *Proc. Of the Sixth World Wide Web Conference*, downloaded from http://decweb.ethz.ch/WWW6/Technical/Paper177/Paper177.html (hereafter referred to as "the Digestor article", which is expressly incorporated herein by reference), notes that there are four general approaches to displaying Web documents on devices with small display screens: namely, device-specific authoring, multiple-device authoring, client-side navigation, and automated re-authoring.

As their names imply, device-specific authoring and multiple-device authoring involves authoring separate Web documents for specific devices and groups of devices, respectively. Obviously, such approaches require more labor for authoring multiple versions of the same underlying content, require more storage to store such multiple versions of the same underlying content, and require special signaling protocols to determine which device is requesting the Web document.

In the client-side navigation approach, the user can interactively navigate a single web page by altering the portion of it that is displayed at any given time (e.g., by scrolling, zooming, panning, expanding, collapsing, etc.). However, it is believed that such approaches are not well suited for devices with limited memory and processing resources, as well as limited bandwidth access. Further, it is believed that such required user interaction would become annoying to many users.

Automated re-authoring involves transforming an arbitrary Web document, such as a Web document designed for a desktop computer with a typical display device, to a document that can be appropriately displayed on a target display device. This transformation may take place on the client device, on a server, and/or on an intermediate proxy server. Many factors should be considered in designing a satisfactory automated re-authoring tool. For example, it may be desirable for the re-authoring process to treat different individual components of a Web document differently.

It is a goal of the present invention to provide a utility that could be used as a part of a re-authoring process. In this regard, it is a goal of the present invention to detect special components, such as navigation bars and/or objectionable navigation bars for example, of Web documents, so that such components may receive special treatment by a re-authoring process.

§ 2. SUMMARY OF THE INVENTION

The disclosed invention may be used to detect so-called "navigation bars" (or "nav bars"). Generally, a navigation bar can be thought of as text, such as a hyper-text link or anchor text for example, without any immediate content. The present invention may detect navigation bars in a Web document by determining whether or not nodes of a parse tree of the Web document are "anchor-heavy".

Once a navigation bar is detected, the present invention may further be used to distinguish objectionable navigation bars (i.e., navigation bars, the rendering of which would be objectionable to users without special re-authoring), from non-objectionable navigation bars (i.e., navigation bars which would not be objectionable to users with no special re-authoring). Naturally, deciding whether or not the way in which content is rendered would be objectionable to a user is a somewhat subjective endeavor. The present invention may distinguish objectionable navigation bars from non-objectionable navigation bars by: (a) determining whether the navigation bar is so small that normal rendering would not be objectionable; (b) determining whether the navigation bar presumably conveys meaningful content; and/or (c) determining whether the navigation bar is a component of a non-objectionable navigation bar (where all components of the non-objectionable navigation bar are navigation bars themselves).

Various other aspects of the present invention are described below.

§ 3. BRIEF DESCRIPTION OF THE DRAWINGS

FIGS. 6A through 6C are a screen shot of an HTML formatted Web document, a WML formatted Web document, and a WML formatted Web document as reformatted in accordance with the present invention, respectively, which illustrate an example of at least some operations of the present invention.

FIGS. 7A through 7C are a screen shot of an HTML formatted Web document, a WML formatted Web document, and a WML formatted Web document as reformatted in accordance with the present invention, respectively, which illustrate a second example of at least some operations of the present invention.

§ 4. DETAILED DESCRIPTION

The present invention involves novel methods, apparatus and data structures for detecting navigation bars, and/or objectionable navigation bars. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regard their invention as the following disclosed methods, apparatus and data structures and any other patentable subject matter.

In the following, an environment in which the present invention may operate is described in § 4.1. Then, functions that may be performed by the present invention are described in § 4.2. Thereafter, exemplary processes, apparatus, methods and data structures that may be used to effect those functions are described in § 4.3. Examples of operations of an exemplary embodiment of the invention are then provided in § 4.4. Finally, some conclusions regarding the present invention are set forth in § 4.5.

§ 4.1 Environment in which the Present Invention May Operate

Figure 1:
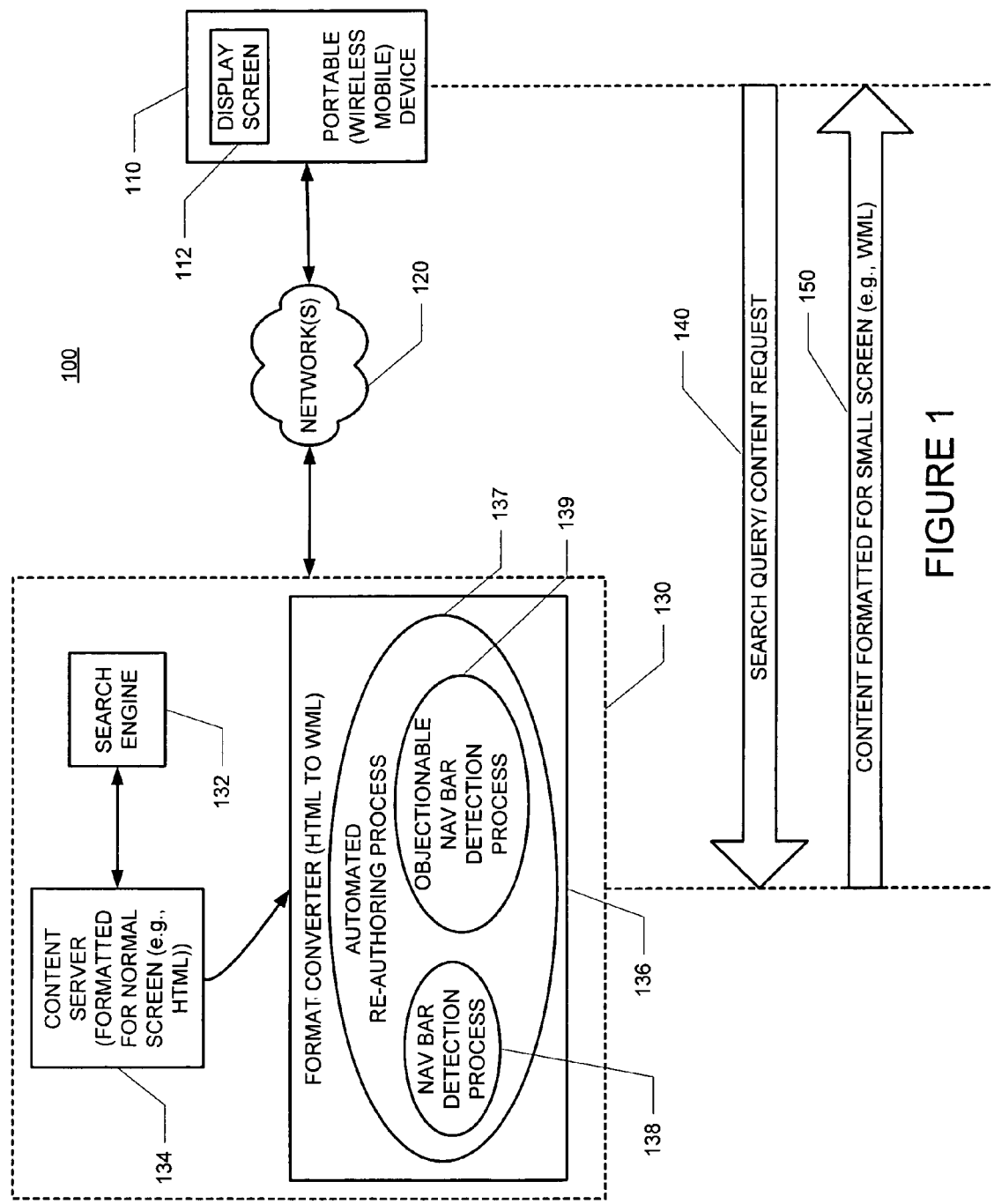
FIG. 1 is a high-level diagram of an environment in which the present invention may operate.

Various aspects of the present invention may take place in an environment in which a device with a relatively small display is to render content, such as Web documents for example, that were designed and authored with the assumption that they would be rendered on larger display devices. FIG. 1 is a high level block diagram of such an environment 100. As shown in FIG. 1, a device 110 with a relatively small display screen 112 can send search queries and/or content requests as indicated by communication 140, and can receive search results and/or content reformatted for its smaller display 112 as indicated by communication 150. The device 110 may be a personal digital assistant, a portable and/or untethered information access device, a (wireless application protocol-enabled (or "WAP-enabled")) cellular phone, a wireless telephone, etc.

A search engine 132 may be used to respond to search queries. An example of such a search engine is that provided and licensed by Google, Inc. of Mountain View, Calif. A content server 134 may provide content, such as Web documents for example, in response to requests. Much of such content will be authored and formatted with the assumption that it will be rendered on a normal size display screen (e.g., 15 inches to 21 inches).

A format converter 136 may be used to convert the format of the content. For example, the format converter 136 may be used to convert content authored and formatted with the assumption that it will be rendered on a normal size display screen (e.g., HTML documents), to a format better suited for rendering on a smaller size display screen (e.g., WML documents). An example of such a format converter 136 is a WAP proxy operated by Google, Inc. of Mountain View, Calif. The present invention may reside within the format converter 136. Naturally, the format converter 136 may be a part of the content server 134 and/or may be a client-side utility on the device 110. Further, the various operations of the format converter 136 may be performed at various facilities (e.g., server, proxy, client device, etc.). The present invention may be used as a part of a format converter 136 as described in § 4.3.1 below. Basically, the format converter 136 may include an automated re-authoring process 137. This process 137 may include a navigation bar detection process 138 and an objectionable navigation bar detection process 139 (which may operate on the results of the navigation bar detection process 138).

The search engine 132, the content server 134, and/or the format converter 136 may be located on or at the same facility 130, or may be separately provided. In any event, the device 110 can communicate with each of these components 132,134,136 via one or more networks 120, such as the Internet for example.

Having described an environment in which the present invention may operate, functions that may be performed by the present invention are now introduced in § 4.2 below. The foregoing exemplary environment illustrates but one application to which the teachings of the present invention may be applied. The teachings of the present invention have other applications. For example, as noted in § 1.1 above, navigation bar detection may be used for determining whether or not to index text, and whether or not to show text in a snippet search result.

§ 4.2 Functions that May be Performed by the Present Invention

The present invention may function to detect navigation bars. Generally, a navigation bar can be thought of as text, such as a hyper-text link or anchor text for example, without any immediate content. The present invention may function to detect navigation bars in a Web document by determining whether or not nodes of a parse tree (which correspond to document components) of the Web document are "anchor-heavy".

Once a navigation bar is detected, in some exemplary embodiments, the present invention may further function to distinguish objectionable navigation bars (i.e., navigation bars, the rendering of which would be objectionable to users without special re-authoring), from non-objectionable navigation bars (i.e., navigation bars which would not be objectionable to users with no special re-authoring). Naturally, deciding whether or not the way in which content is rendered would be objectionable to a user is a somewhat subjective endeavor. The present invention may distinguish objectionable navigation bars from non-objectionable navigation bars by: (a) determining whether the navigation bar is so small that normal rendering would not be objectionable; (b) determining whether the navigation bar presumably conveys meaningful content; and/or (c) determining whether the navigation bar is a component of a non-objectionable navigation bar (where all components of the non-objectionable navigation bar are navigation bars themselves).

Having introduced various functions which may be performed by the present invention, exemplary processes, architecture, methods and data structures that may be used to perform at least some of those functions are described in § 4.3 below.

§ 4.3 Exemplary Processes, Architecture, Methods and Data Structures

In the following, processes that may be performed by the present invention are introduced in § 4.3.1 below. Then, architecture, methods and data structures that may be used to effect these processes are described in § 4.3.2.

§ 4.3.1 Processes

Referring back to FIG. 1, a format converter 136 may effect an automated re-authoring process 137. Such an automated re-authoring process 137 may include a navigation bar detection process 138 and an objectionable navigation bar detection process 139. The present invention may perform these processes 138,139.

§ 4.3.2 Exemplary Embodiment(s)

Exemplary systems on which the navigation bar detection process 138 and/or the objectionable navigation bar detection process 139 may be effected are described in § 4.3.2.1 below. Then exemplary data structures that may be used by these processes, as well as exemplary methods that may be used to effect these processes are described in § 4.3.2.2 below.

§ 4.3.2.1 Exemplary Architectures

Figure 2:
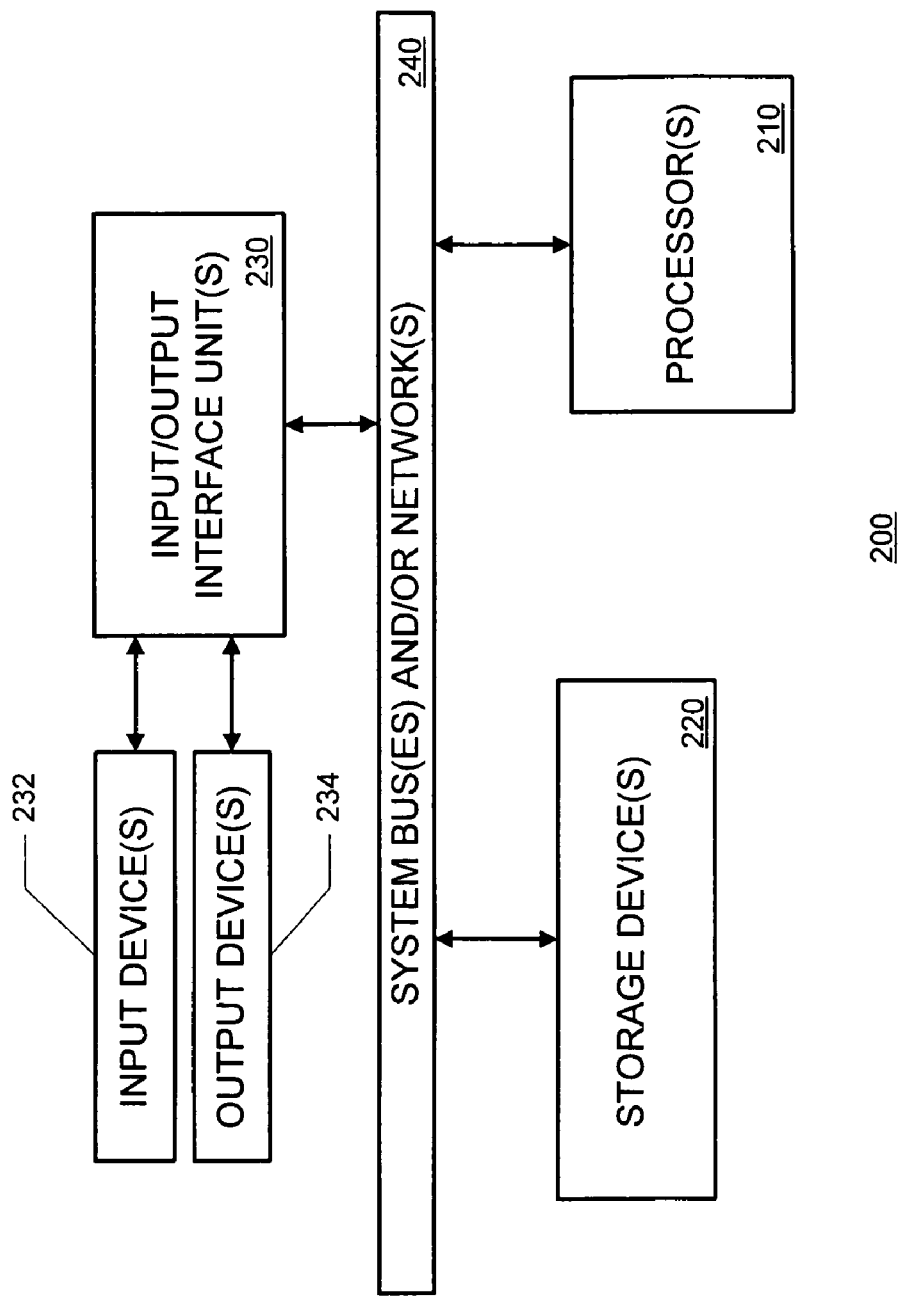
FIG. 2 is a high-level block diagram of an exemplary machine which may be used to effect various processes.

FIG. 2 is high-level block diagram of a machine 200 that may effect one or more of the processes discussed above. The machine 200 basically includes a processor(s) 210, an input/output interface unit(s) 230, a storage device(s) 220, and a system bus(es) and/or a network(s) 240 for facilitating the communication of information among the coupled elements. An input device(s) 232 and an output device(s) 234 may be coupled with the input/output interface(s) 230.

The machine 200 may be a computer such as a personal computer for example. In such an embodiment, the processor(s) 210 may be a microprocessor, the storage device(s) 220 may include RAM, ROM, magnetic, optical, and/or magneto-optical (disk) storage facilities, the input device(s) 232 and interfaces 230 may include a keyboard, various ports, a communication port, network terminal adapters, etc., and the output device(s) 234 and interfaces 230 may include a video display device, a speaker(s), various ports, etc.

The processes 138/139 may be effected by the machine 200 by having the processor(s) 210 execute machine-executable instructions which may be stored on a storage device(s) 220 and/or received via an input device 232, an input interface 230 and the system bus or network 240.

Having described processes that may be performed by the present invention, as well as an exemplary device that may be used to effect such processes, exemplary methods and data structures that may be used to perform such processes are described in § 4.3.2.2 below.

§ 4.3.2.2 Exemplary Methods and Data Structures

Figure 3:
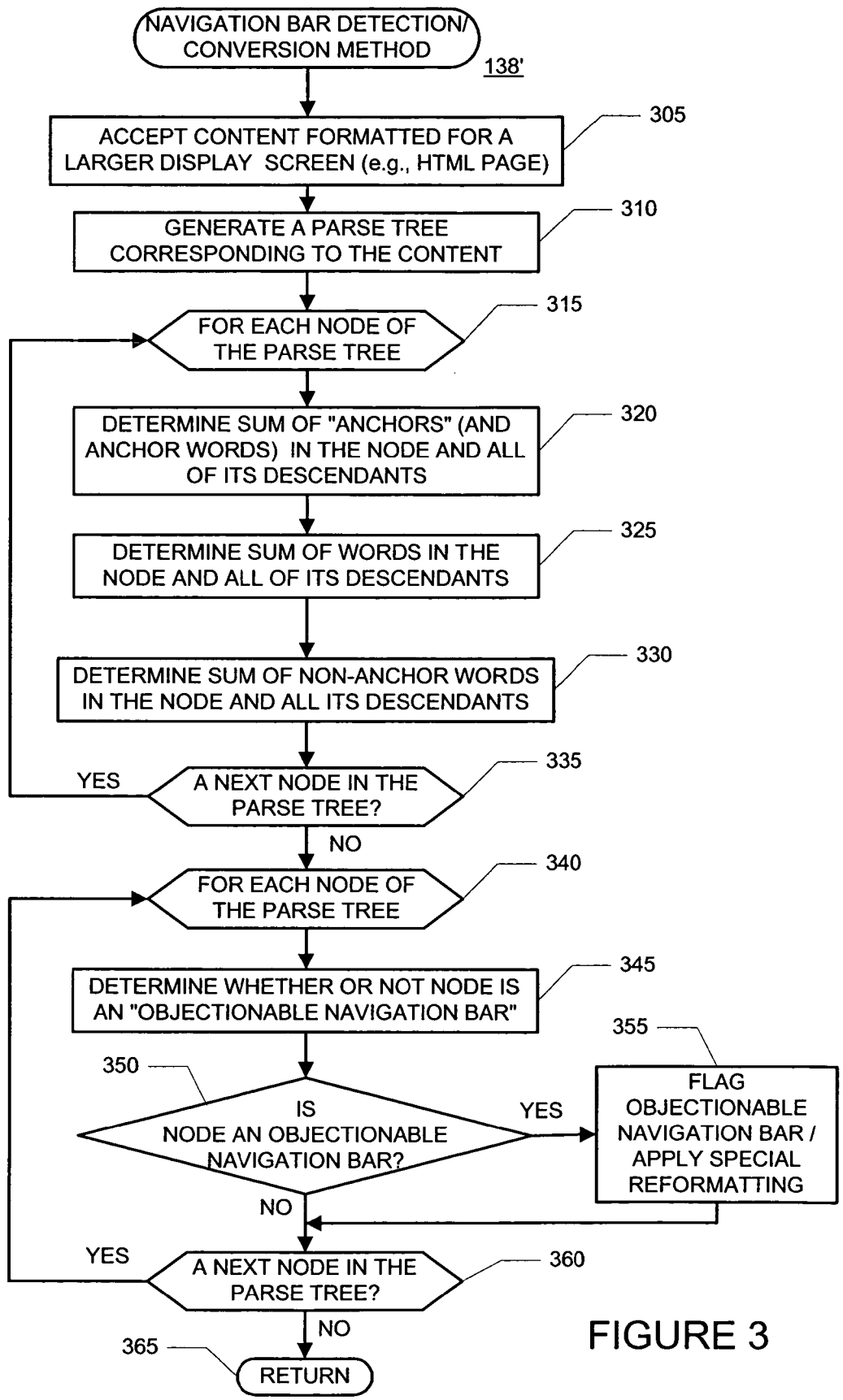
FIG. 3 is a flow diagram of an exemplary navigation bar detection/conversion method.

FIG. 3 is a high-level flow diagram of an exemplary method 138' that may be used to detect and/or convert navigation bars (e.g., found in HTML Web documents). As indicated by block 305, content (e.g., an HTML document) formatted for rendering on a large size display screen (e.g., 15 inches to 21 inches) is accepted. Then, as indicated by block 310, a parsed tree corresponding to the content is generated. The generation of parse trees is well-known. (See, e.g., the text Aho et al., "Compilers—Principles, Techniques and Tools", Addison-Wesley Publishing Co., (1985).) An exemplary parse tree is now described with reference to FIG. 4.

Basically, a parse tree is a hierarchical representation of a segment of a document (e.g., an HTML page) based on inclusive relationships between components. That is, if component A is "included in" component B, then a node A will be a child (or more generally, a descendant) of a node B in the parse tree. For example, the following HTML document segment:

```
<p>
    This is a <a href="http://foobar.com">link</a>.
    <ul>
        <li> foo!sample.
        <li> list item.
    </ul>
</p>
```

Figure 4:
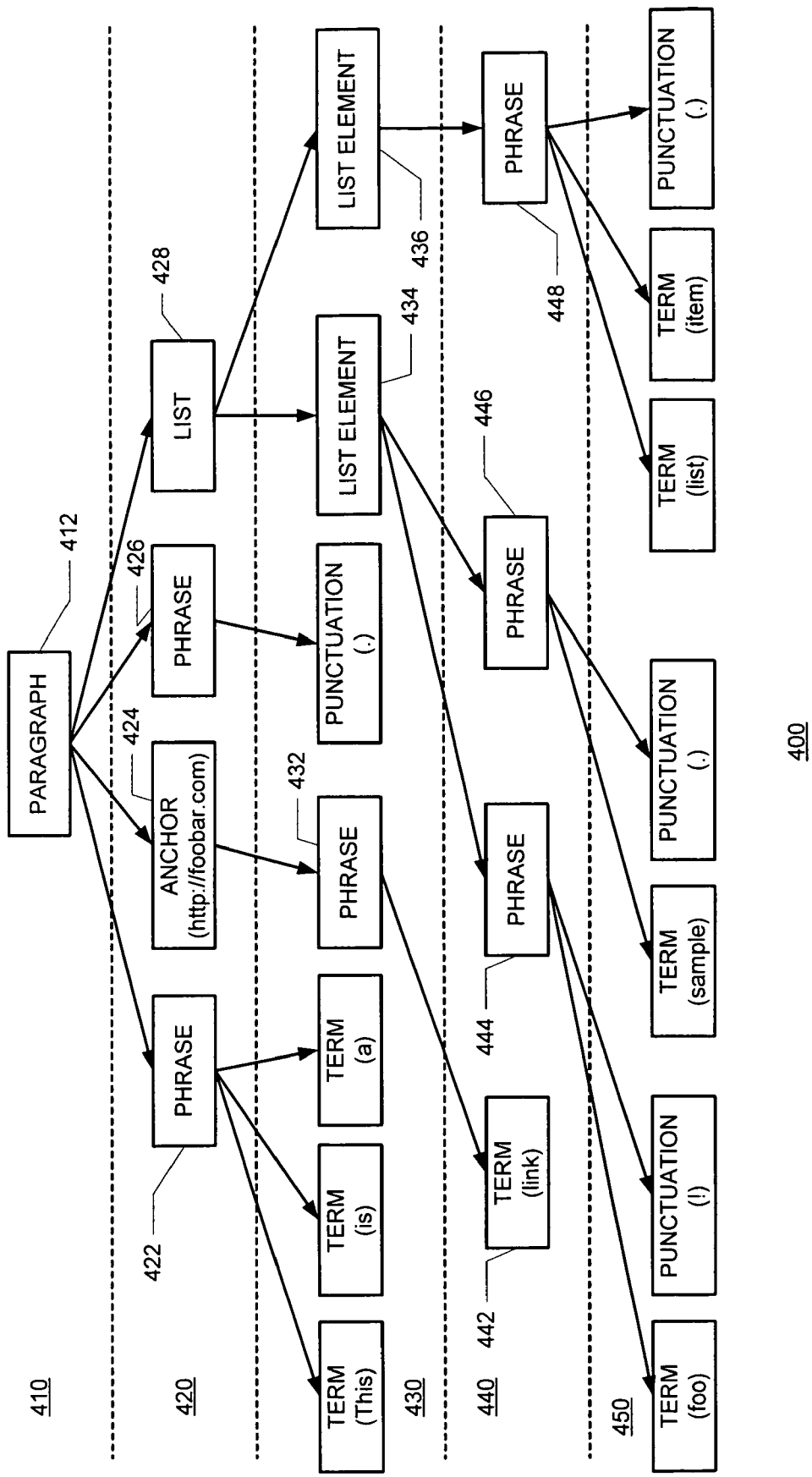
FIG. 4 illustrates an example of a parse tree which may be generated by the method of FIG. 3.

Can be represented by the parse tree 400 of FIG. 4.

As shown in FIG. 4, the parse tree 400 includes hierarchical levels 410, 420, 430, 440, and 450. The top-level 410 includes a paragraph node 412. This node 412 corresponds to the first line of the foregoing HTML segment. As indicated in level 420, a phrase 422, an anchor 424, another phrase 426 and a list 428 are included in the paragraph 412. Nodes 422, 424, and 426 correspond to the second line, and node 428 corresponds to the third line, of the foregoing HTML segment. As indicated in level 430, a number of terms are included in the phrase node 422, a phrase 432 is included in the anchor node 424, a punctuation is included in the phrase node 426, and two list elements 434, 436 are included in the list node 428. These list element nodes 434, 436 correspond to the fourth and fifth lines of the foregoing HTML segment. As indicated in level 440, a term 442 is included in the phrase node 432, phrases 444 and 446 are included in list element node 434, and phrase 448 is included in list element 436. Finally, as indicated in level 450, terms and punctuations are included in the phrases 444, 446 and 448.

Referring back to FIG. 3, as indicated by loop 315–335, certain properties of each node of the parse tree are determined. For example, as indicated by block 320, the sum of all "anchors" (and, in one embodiment, the sum of all "anchor words") of (a document component corresponding to) a given node and all of its descendents may be determined. Anchors may be text defining a (e.g., hypertext) link. An example of an anchor is text that occurs inside an HREF line in HTML, or between <a> and </a> tags in HTML. Anchor words may be the number of words in the anchor (or link). As indicated by block 325, the sum of all words of (a document component corresponding to) a given node and all of its descendents may be determined. Finally, as indicated by block 330, the sum of all non-anchor words of (a document component corresponding to) the given node and all of its descendents are determined. In the alternative embodiment in which the sum of all "anchor words" was already determined in block 320, these values may be determined based on the previous two determinations (i.e., sum of all words less sum of all anchor words yields sum of all non-anchor words). To reiterate, as indicated by loop 315–335, each node of the parse tree may be processed as described above.

As indicated by loop 340–360, each of the nodes may be checked to determine whether or not it corresponds to an objectionable navigation bar. Block 345 indicates this determination. As indicated by conditional branch point 350 and block 355, if the node is an objectionable navigation bar, then the node is so identified and/or special reformatting is applied as a part of a re-authoring process. After all nodes are processed, the method 138' is left via RETURN node 365. As will become apparent from the description of FIG. 5 below, in some instances, certain nodes may be disqualified ahead of time from being an objectionable navigation bar.

Although the method 138' was described as including two loops through each of the nodes, the nodes of the parsed tree can be processed in alternative ways (e.g., breadth first, depth first, etc.). Further, the processing can be done in real time, in response to a request for content, in its entirety. Alternatively, at least some, if not all, of the steps of the method 138' can be pre-computed, before a request for content is received. A post order (e.g., bottom-up) traversal of the parse tree is a preferred way of performing acts 320, 325 and 330.

Figure 5:
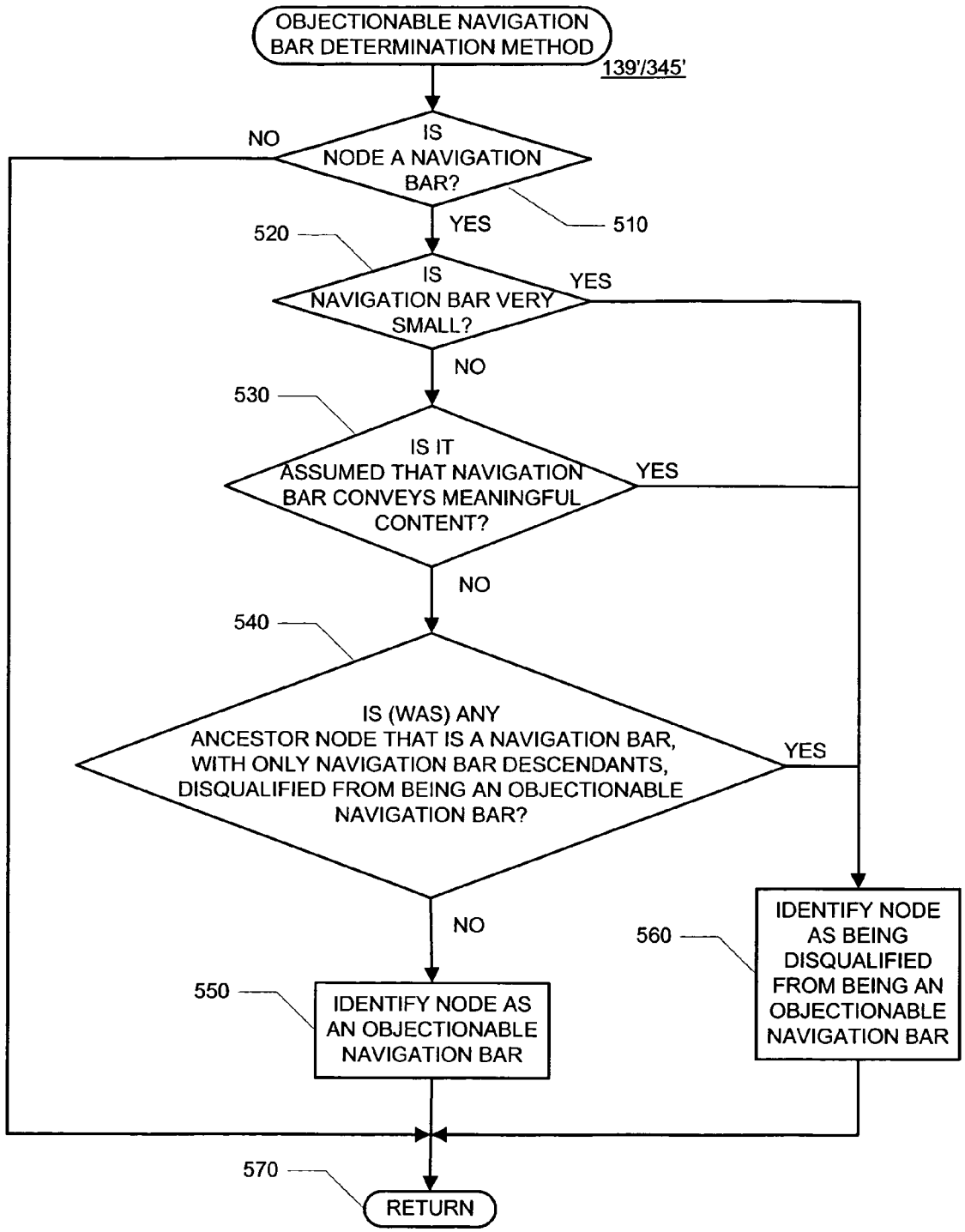
FIG. 5 is a flow diagram of an exemplary method for determining whether or not a component of a Web page is an objectionable navigation bar.

Recall from the process 139 of FIG. 1 and step 345 of FIG. 3 that whether or not a node corresponds to an objectionable navigation bar may be determined. FIG. 5 is a high level flow diagram of an exemplary method 139'/345' that may be used to make such a determination. Initially, whether or not a given node corresponds to a navigation bar in general (without regard to whether or not it is objectionable) may be determined as indicated by conditional branch point 510. If the node does not correspond to a navigation bar, the method 139'/345' is left via RETURN node 570. If, on the other hand, it is determined that the node corresponds to a navigation bar, further acts may be used to determine whether or not the navigation bar is objectionable, and the method 139'/345' branches to conditional branch point 520. Although shown differently in the embodiment shown, the navigation bar may be presumed to be objectionable, but can be disqualified from being considered objectionable.

Referring back to conditional branch point 510, whether or not a node is a navigation bar may be determined as follows. Recall that, generally speaking, a navigation bar can be thought of as text, such as a hyper-text link or anchor text for example, without any immediate content. To reiterate, this determination may be somewhat subjective. The following exemplary heuristic may be use to automate this determination. A node is considered to be a navigation bar if it is "anchor-heavy". To reiterate, anchors may be text defining a (e.g., hypertext) link, such as text that occurs inside an HREF line in HTML for example. Whether or not (a node corresponding to) a component is "anchor-heavy" will be based on the number of anchors versus the amount of non-anchor text (e.g., the number of non-anchor words) within the component. In the exemplary heuristic, a node is considered to be "anchor-heavy" if it contains more than a predetermined number of anchors (>min_anchors, where min_anchors may be three or about three for example) and has more anchors (Recall block 320 of FIG. 3.) than non-anchor words (Recall block 330 of FIG. 3.).

In one embodiment, if a particular anchor has more than a predetermined number of words (>max_words_in_anchor _word, where max_words_in_anchor_word may be four or about four for example), those words are treated as non-anchor words in the forgoing determination. The rationale for this alternative adjustment is that an anchor with a relatively large number of words can be assumed to convey meaningful content (which is contrary to the definition of a navigation bar relevant to the exemplary embodiment of the invention).

Other heuristics for determining whether or not (a node corresponding to) a component is anchor-heavy may be used. For example, such (a node corresponding to) a component may be considered to be anchor-heavy if the number of anchors (or, alternatively, the number of anchor words) is greater than the amount of non-anchor text (e.g., the number of non-anchor words) in the component, or, in an alternative heuristic, whether or not the ratio of anchors (or, alternatively, anchor words) to non-anchor text (e.g., the number of non-anchor words) is greater than a predetermined value (e.g., one).

Resuming at conditional branch point 520 of FIG. 5, it may be determined whether the navigation bar is very small. For example, a navigation bar may be considered very small if its corresponding node has less than a predetermined number of anchors (=min_anchors, where min_anchors may be three or about three for example). The rationale for this test is that even if a part of a Web document corresponds to a navigation bar, if it doesn't occupy much space, it won't be objectionable since it won't occupy much space even on a smaller display screen. If the navigation bar is found to be very small, the method 139'/345' braches to block 560 where the node is identified as being disqualified from being an objectionable navigation bar. The results of this act 560 may be used in later determinations. (See, e.g., conditional branch point 540.) If, however, such results are not required, the act 560 need not be performed. Referring back to conditional branch point 520, if the navigation bar is not found to be very small, the method 139'/345' may branch to conditional branch point 530.

At conditional branch point 530, it may be determined whether the navigation bar conveys any meaningful content. (This is similar to the alternative adjustment described above with reference to decision branch point 510.) For example, a navigation bar may be considered to convey meaningful content if it occupies at least a predetermined amount of the Web document. Whether or not a navigation bar occupies at least a predetermined amount of the Web document may be determined spatially and geometrically, based on the format of the Web document. However, a words ratio criteria may be used as a simple approximation of such a more complicated special/geometric test. For example, a navigation bar may be considered to convey meaningful content if the number of words associated with the node (and its descendents) divided by the total number associated with words in the Web document is greater than a predetermined threshold (>max_r_words_%, where max_r_words may be in a range from about 33% to about 50%), then it can be assumed that the navigation bar associated with the node conveys meaningful content. If the navigation bar is assumed to convey meaningful content, in view of the words ratio test for example, the method 139'/345' branches to block 560 where the node is identified as being disqualified from being an objectionable navigation bar. Referring back to conditional branch point 530, if the navigation bar is not assumed to convey meaningful content, the method 139'/345' may branch to conditional branch point 540.

At conditional branch point 540, it is determined whether any ancestor node of the given node was determined to be a navigation bar, has only navigation bar descendants, and was disqualified from being an objectionable navigation bar (Recall, e.g., step 560). If so, the given node is disqualified as an objectionable navigation bar as indicated by block 560. Note that the condition that the disqualified ancestor node has only navigation bar descendants implies that only a continuous chain of "navigation bar" nodes is considered. Therefore, processing could start at a given node, moving up one ancestor at a time, and quitting if and when an ancestor that is not a navigation bar (e.g., is not anchor-heavy) is reached. In one embodiment of this test, the ancestor node must have been disqualified based on a relative size test, such as the one just described above with reference to conditional branch point 530.

Figure 8A:
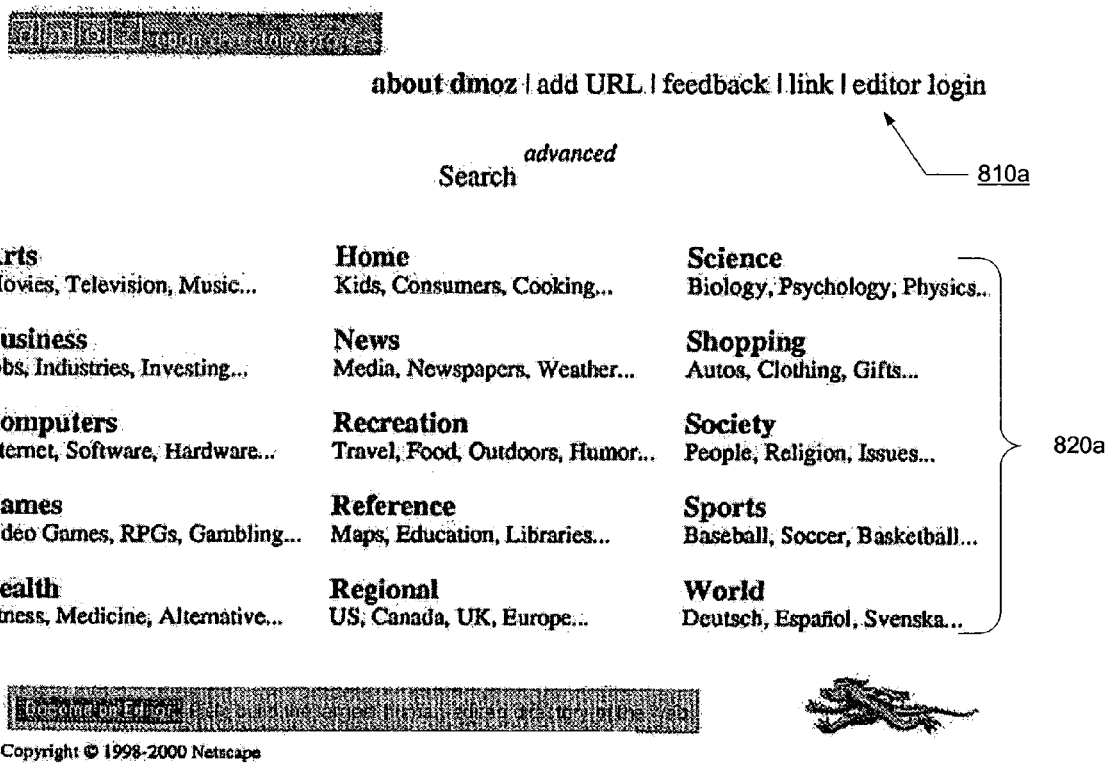
FIGS. 8A through 8C are a screen shot of an HTML formatted Web document, a WML formatted Web document, and a WML formatted Web document as reformatted in accordance with the present invention, respectively, which illustrate a third example of at least some operations of the present invention.
Figure 9:
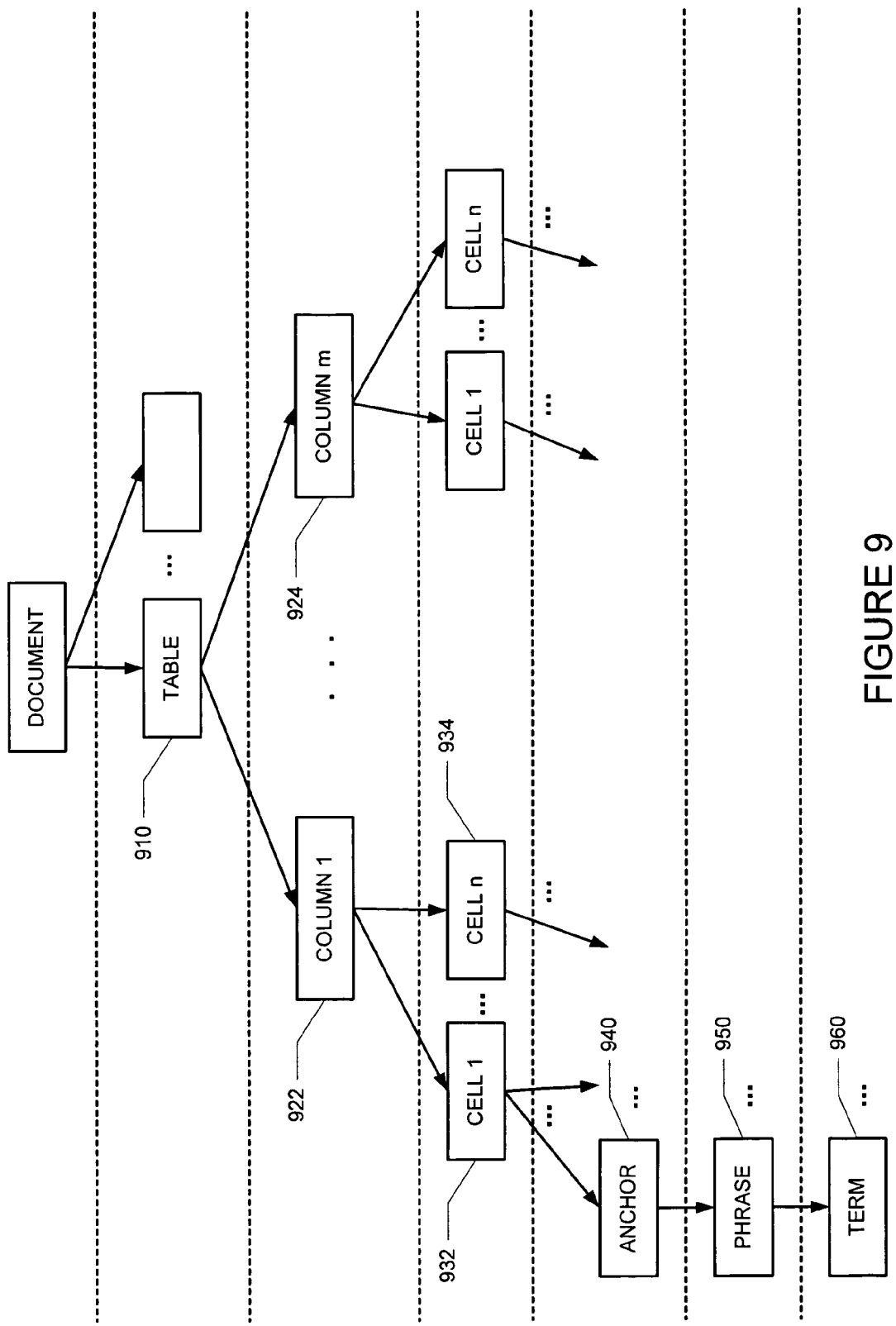
FIG. 9 illustrates an example of a parse tree corresponding to a table component of a Web document.

The rationale for this test is that if a node is a navigation bar that is a component or part of a larger navigation bar that includes only other navigation bars, if that larger navigation bar is disqualified as an objectionable navigation bar, its individual components, all of which are navigation bars, will not be permitted to be qualified as an objectionable navigation bar. FIGS. 8A and 9 illustrate an application of this test to an exemplary Web document having a table. As shown in FIG. 9, the document may include a table represented by node 910, the table node 910 may include a number of row nodes 922, 924 corresponding to rows, each row node 922, 924 may include a number of cell nodes 932, 934 corresponding to cells, each of the cell nodes 932, 934 may include nodes corresponding to anchors, each of the anchor nodes 940 (only one shown to simplify the drawing) may include nodes corresponding to phrases, and each of the phrase nodes 950 (only one shown to simplify the drawing) may include nodes corresponding to terms and/or punctuation. Now assume that the table component is a navigation bar, each of the rows is a navigation bar, and each of the cells is a navigation bar. Assume further that the table node 910 is disqualified from being classified as an objectionable navigation bar because the number of its (and its descendants) words is greater than a predetermined percentage (e.g., 33%) of the total number of words in the Web document. As a consequence of the test associated with conditional branch point 540, the column nodes 922 and 924 are also disqualified from being classified as an objectionable navigation bar because, in each case, its ancestor (i.e., node 910) was disqualified and has only navigation bar nodes as children. Similarly, the cell nodes 932, 934 are also disqualified, and so on.

Now, referring back to the conditional branch point 540, if, on the other hand, the test is not met, the node is identified as an objectionable navigation bar as indicated by step 550, before the method 139'/345' is left via RETURN node 570. Notice that the determination of conditional branch point 540 requires characteristics about a node's ancestor nodes. Thus, in one embodiment of the invention, ancestor nodes may be processed before their descendants.

Note that the conditional branch points 520, 530, 540 may be processed in any order, and that not all of these tests are strictly necessary.

§ 4.4 Examples of Operations in an Exemplary Embodiment

This section provides three examples which illustrate operations of an exemplary embodiment of the present invention. The SF (San Francisco) Gate Traffic HTML page display, as well as its WML display pages without and with the present invention are illustrated in § 4.4.1 below with reference to FIGS. 6A through 6C. The Microsoft Network (MSN) Love & Relationships HTML page display, as well as its WML display pages without and with the present invention are illustrated in § 4.4.2 below with reference to FIGS. 7A through 7C. Finally, the Open Directory Project HTML page display, as well as its WML display pages without and with the present invention are illustrated in § 4.4.3 below with reference to FIGS. 8A through 8C.

§ 4.4.1 San Francisco Gate Traffic Page Example

FIGS. 6A through 6C are a screen shot of an HTML formatted Web document, a WML formatted Web document, and a WML formatted Web document as reformatted in accordance with the present invention, respectively, which illustrate an example of at least some operations of the present invention.

As shown in FIG. 6A, a number of navigation bars 610a through 650a appear in the left column of the SF Gate Traffic HTML page. As shown in FIG. 6B, without the present invention, these navigation bars would be presented in full, as denoted by labels 610b through 650b. Finally, as shown in FIG. 6C, an exemplary embodiment of the present invention may determine that these navigation bars are part of a component which may be considered an objectionable navigation bar. That is, the left column of hyper-text links is anchor-heavy, is not very small, does not occupy at least a predetermined amount (e.g., 33 percent) of the screen, and is not a descendant of a navigation bar that was disqualified from being classified as an objectionable navigation bar and that only has navigation bars as its children. As shown in FIG. 6C, the objectionable navigation bar, including navigation bars 610 through 650, is provided in one line 610c–650c as a hyper-text link to the individual navigation bars. Notice that the present invention frees space for other information.

§ 4.4.2 MSN Love & Relationships Page Example

FIGS. 7A through 7C are a screen shot of an HTML formatted Web document, a WML formatted Web document, and a WML formatted Web document as reformatted in accordance with the present invention, respectively, which illustrate a second example of at least some operations of the present invention.

As shown in FIG. 7A, a number of navigation bars 710a through 740a (actually, component 730a is not considered a navigation bar, as will be explained below) appear across the top and in the left column of the MSN Love & Relationships HTML page. As shown in FIG. 7B, without the present invention, these navigation bars would be presented in full, as denoted by labels 710b through 740b. Finally, as shown in FIG. 7C, an exemplary embodiment of the present invention may determine that some of these navigation bars are objectionable navigation bars. That is, each of the navigation bars 710a, 720a, and 740a is not very small, does not occupy at least a predetermined amount (e.g., 33 percent) of the screen, and is not a descendant of a navigation bar that was disqualified from being classified as an objectionable navigation bar and that has only navigation bars as its children. However, since the hyper-text link "More communities . . . " has more than a predetermined number of words (e.g., four), the non-anchor word count is incremented. Thus, the navigation bar 730a is not deemed objectionable. Indeed, since the component 730a is not anchor-heavy in accordance with one exemplary embodiment of the present invention, it is not even considered to be a navigation bar. This is because it is presumed (by virtue of its word count) that this component has immediate context. As shown in FIG. 7C, each of the objectionable navigation bars, 710a, 720a and 740a, are provided in a single line 710c, 720c and 740c, respectively as a hyper-text link to the individual navigation bars. Notice, however, that since component 730a was disqualified from being classified as an objectionable navigation bar (or more specifically, was not found to be a navigation bar), it is rendered over multiple lines 730c, in the same manner as 730b.

§ 4.4.3 Open Directory Project Page Example

Figure 8B:
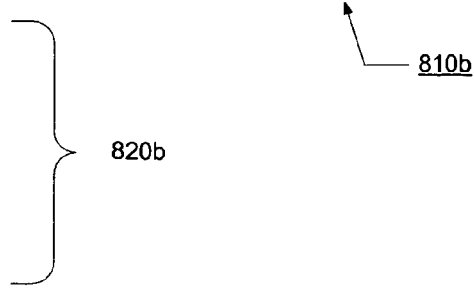
Figure 8C:
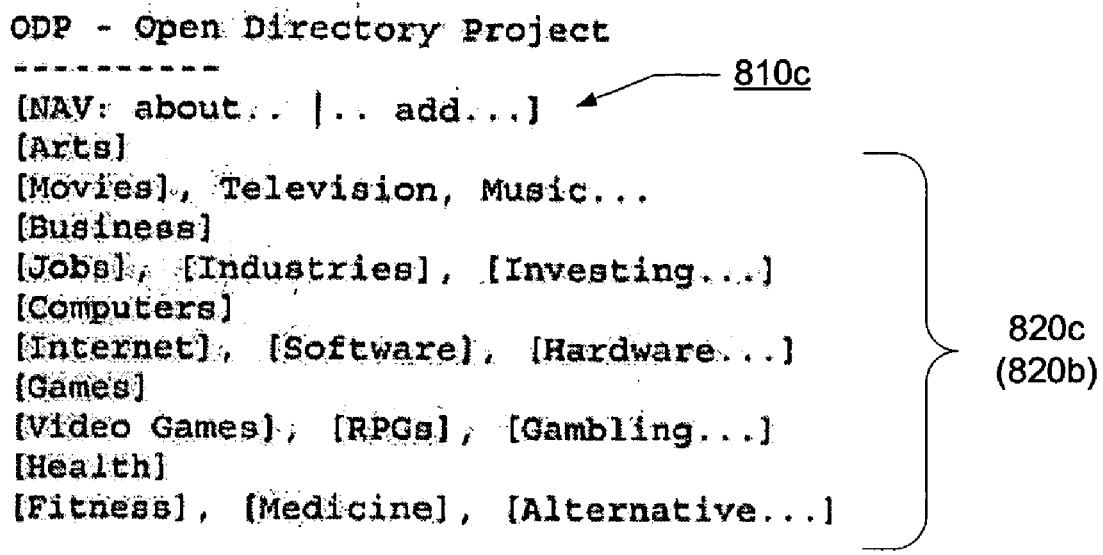

FIGS. 8A through 8C are a screen shot of an HTML formatted Web document, a WML formatted Web document, and a WML formatted Web document as reformatted in accordance with the present invention, respectively, which illustrate a third example of at least some operations of the present invention.

As shown in FIG. 8A, navigation bars 810a and 820a appear across the top and in the center, respectively, of the "ODP" HTML page. As shown in FIG. 8B, without the present invention, these navigation bars would be presented in full, as denoted by labels 810b and 820b. Finally, as shown in FIG. 8C, an exemplary embodiment of the present invention may determine that one of these navigation bars is an objectionable navigation bars. That is, navigation bar 810a is not very small, does not occupy at least a predetermined amount (e.g., 33 percent) of the screen, and is not a descendant of a navigation bar that was disqualified from being classified as an objectionable navigation bar and that has only navigation bars as its children. On the other hand, since the navigation bar 820a takes up more than a predetermined amount (e.g., 33 percent) of the screen, it is disqualified from being deemed objectionable. Further, although each of the column and cell components of the table 820a may be navigation bars, since each is a descendant of a disqualified navigation bar (i.e., the table) and since that table has only navigation bar components, each of the column and cell components of the table 820a are disqualified from being classified as an objectionable navigation bar. As shown in FIG. 8C, the objectionable navigation bar 810a is provided in a single line 810c as a hyper-text link to the links in the navigation bar. Notice, however, that since component 820a was disqualified from being classified as an objectionable navigation bar, it is rendered over multiple lines 820c, in the same manner as 820b.

§ 4.5 Conclusions

As can be appreciated from the foregoing disclosure, the present invention discloses various techniques for detecting navigation bars in general, and objectionable navigation bars in particular, in documents (e.g., HTML) designed with the assumption that they will be rendered on larger display screens (e.g., 15 inch to 21 inch). Being able to detect objectionable navigation bars allows an automated re-authoring process to generate more meaningful and intuitively navigable pages (e.g., WML) formatted for smaller screens (e.g., those on portable devices, such as mobile telephones).

What is claimed is:

1. A machine-implemented method for processing a document, the machine-implemented method comprising:
   a) segmenting, with a machine, the document into components; and
   b) for each of the components,
      i) analyzing anchors of the component,
      ii) analyzing non-anchor text of the component, and
      iii) re-authoring the component, wherein the act of re-authoring the component is controlled using the analysis of the anchors and the non-anchor-text of the component,
   wherein the act of re-authoring the component is controlled based on a number of anchors in the component and a number of non-anchor words in the component.

2. The machine-implemented method of claim 1 wherein
   i) the act of analyzing anchors of the component includes determining, with the machine, a number of anchors in the component,
   ii) the act of analyzing non-anchor-text of the component includes determining, with the machine, a number of non-anchor words in the component, and
   iii) if the number of anchors is greater than a predetermined threshold and if the number of anchors is greater than the number of non-anchor words, then controlling the act of re-authoring the component to apply a special reformatting.

3. The machine-implemented method of claim 2 wherein the predetermined threshold is three.

4. The machine-implemented method of claim 2 wherein the special reformatting reduces a number of display screen lines on which navigation bar information is presented.

5. The machine-implemented method of claim 2 wherein the special reformatting replaces a navigation bar with a link to the navigation bar.

6. The machine-implemented method of claim 1 wherein the acts of re-authoring the components of the document effectively reformat the document from a format for effectively rendering the document on a display of a first size to a format for effectively rendering the document on a smaller display.

7. The machine-implemented method of claim 1 wherein
  i) the act of analyzing anchors of the component includes determining, with the machine, a first count to be a number of anchors in the component,
  ii) the act of analyzing non-anchor-text of the component includes determining, with the machine, a second count to be a number of non-anchor words in the component, and incrementing, with the machine, the second count by the number of words in an anchor having more words than a predetermined threshold to determine a non-anchor word count, and
  iv) if the first count is greater than a second predetermined threshold and if the first count is greater than the non-anchor word count, then controlling the act of re-authoring the component to apply a special reformatting.

8. The machine-implemented method of claim 7 wherein the predetermined threshold is four.

9. The machine-implemented method of claim 7 wherein the special reformatting reduces a number of display screen lines on which navigation bar information is presented.

10. The machine-implemented method of claim 7 wherein the special reformatting replaces a navigation bar with a link to the navigation bar.

11. The machine-implemented method of claim 1 wherein the act of segmenting the document into components includes generating, with the machine, a parse tree based on the document, wherein a first node corresponding to a first component is a child of a second node of a second component if the first component is included in the second component.

12. The machine-implemented method of claim 11 wherein the act of re-authoring the component is controlled using (i) a number of anchors in a node corresponding to the component and all descendant nodes of the node, and (ii) a number of non-anchor words in the node corresponding to the component and all the descendant nodes of the node.

13. The machine-implemented method of claim 11 wherein
  i) the act of analyzing anchors of the component includes determining, with the machine, a number of anchors in a node corresponding to the component and all descendant nodes of the node,
  ii) the act of analyzing non-anchor-text of the component includes determining, with the machine, a number of non-anchor words in the node corresponding to the component and all the descendant nodes of the node, and
  iii) if the number of anchors is greater than a predetermined threshold and if the number of anchors is greater than the number of non-anchor words, then controlling the act of re-authoring the component to apply a special reformatting.

14. The machine-implemented method of claim 13 wherein the predetermined threshold is three.

15. The machine-implemented method of claim 11 wherein
  i) the act of analyzing anchors of the component includes determining, with the machine, a first count to be a number of anchors in a node corresponding to the component and all descendant nodes of the node,
  ii) the act of analyzing non-anchor-text of the component includes determining, with the machine, a second count to be a number of non-anchor words in a node corresponding to the component and all descendant nodes of the node,
  iii) incrementing, with the machine, the second count by the number of words in an anchor having more words than a predetermined threshold to determine a non-anchor word count, and
  iv) if the first count is greater than a second predetermined threshold and if the first count is greater than the non-anchor word count, then controlling the act of re-authoring the component to apply a special reformatting.

16. The machine-implemented method of claim 1 wherein the acts of re-authoring the components of the document effectively reformat the document from HTML to WML.

17. A machine-implemented method for processing a document, the method comprising:
  a) segmenting, with the machine, the document into components;
  b) for each of the components, determining, with the machine, whether or not the component is a navigation bar; and
  c) for each of the components that is determined to be a navigation bar,
    i) classifying, with the machine, the navigation bar as one of (A) a navigation bar of a first type, and (B) a navigation bar of a second type, and
    ii) re-authoring the navigation bar, wherein the re-authoring of the navigation bar is controlled based on whether the navigation bar was classified as a navigation bar of a first type or a navigation bar of a second type, wherein the act of determining, for each of the components, whether or not the component is a navigation bar is based on a number of anchors in the component and a number of non-anchor words in the component.

18. The machine-implemented method of claim 17 wherein the act of determining whether or not the component is a navigation bar includes
  i) determining, with the machine, a number of anchors in the component,
  ii) determining, with the machine, a number of non-anchor words in the component, and
  iii) if the number of anchors is greater than a predetermined threshold and if the number of anchors is greater than the number of non-anchor words, then determining, with the machine, that the component is a navigation bar.

19. The machine-implemented method of claim 18 wherein the act, for each of the components that is determined to be a navigation bar, of determining whether or not the navigation bar is disqualified from being classified as an objectionable navigation bar includes determining, with the machine, whether a disqualification condition, selected from a group of disqualification conditions consisting of (a) if the component has less than a predetermined number of anchors, (b) if the component has more than a predetermined percentage of words of the document, and (c) if the component is an element of a disqualified component and that disqualified component has only navigation bar elements, exists.

20. The machine-implemented method of claim 17 wherein the act, for each of the components that is determined to be a navigation bar, of determining whether or not the navigation bar is disqualified from being classified as an objectionable navigation bar includes determining, with the machine, whether a disqualification condition, selected from a group of disqualification conditions consisting of (a) if the component has less than a predetermined number of anchors, (b) if the component has more than a predetermined percentage of words of the document, and (c) if the component is an element of a disqualified component and that disqualified component has only navigation bar elements, exists.

21. The machine-implemented method of claim 17 wherein the acts of re-authoring the components of the document effectively reformat the document from HTML to WML.

22. A machine-implemented method for processing a document, the method comprising:
   a) segmenting, with the machine, the document into components;
   b) for each of the components, determining, with the machine, whether or not the component is a navigation bar; and
   c) for each of the components that is determined to be a navigation bar,
      i) determining, with the machine, whether or not the navigation bar is disqualified from being classified as an objectionable navigation bar, and
      ii) re-authoring the navigation bar, wherein the re-authoring of the navigation bar is controlled using the determination of whether or not the navigation bar is disqualified from being classified as an objectionable navigation bar, wherein the act, for each of the components that is determined to be a navigation bar, of determining whether or not the navigation bar is disqualified from being classified as an objectionable navigation bar includes determining, with the machine, whether a disqualification condition, selected from a group of disqualification conditions consisting of (a) if the component has less than a predetermined number of anchors, (b) if the component has more than a predetermined percentage of words of the document, and (c) if the component is an element of a disqualified component and that disqualified component has only navigation bar elements, exists.

23. A machine-implemented method for processing a document, the machine-implemented method comprising:
   a) segmenting, with a machine, the document into components by generating a parse tree based on the document, wherein a first node corresponding to a first component is a child of a second node of a second component if the first component is included in the second component;
   b) for each of the nodes of the parse tree, determining, with the machine, whether or not the node corresponds to a navigation bar component; and
   c) for each of the nodes that is determined to correspond to a navigation bar,
      i) determining, with the machine, whether or not the navigation bar is disqualified from being classified as an objectionable navigation bar, and
      ii) re-authoring the navigation bar, wherein the re-authoring of the navigation bar is controlled using the determination of whether or not the navigation bar is disqualified from being classified as an objectionable navigation bar, wherein the act, for each of the nodes that is determined to correspond to a navigation bar, of determining whether or not the navigation bar is disqualified from being classified as an objectionable navigation bar includes determining, with the machine, whether a disqualification condition, selected from a group of disqualification conditions consisting of (a) if the component associated with the node has less than a predetermined number of anchors, (b) if the component associated with the node has more than a predetermined percentage of words of the document, and (c) if the node has a disqualified ancestor node and that all descendant nodes of the disqualified ancestor node are associated with navigation bar components, exists.

24. The machine-implemented method of claim 23 wherein the acts of re-authoring the components of the document effectively reformat the document from HTML to WML.

25. A machine-readable medium having machine executable instructions thereon, wherein when the machine executable instructions are executed on a machine, the machine:
   a) segments the document into components; and
   b) for each of the components,
      i) analyzes anchors of the component,
      ii) analyzes non-anchor text of the component, and
      iii) re-authors the component, wherein the act of re-authoring the component is controlled using the analysis of the anchors and the non-anchor-text of the component, wherein the act of re-authoring the component is controlled based on a number of anchors in the component and a number of non-anchor words in the component.

26. A machine-readable medium having machine executable instructions thereon, wherein when the machine executable instructions are executed on a machine, the machine:
   a) segments the document into components;
   b) for each of the components, determines whether or not the component is a navigation bar; and
   c) for each of the components that is determined to be a navigation bar,
      i) determines whether or not the navigation bar is disqualified from being classified as an objectionable navigation bar, and
      ii) re-authors the navigation bar, wherein the re-authoring of the navigation bar is controlled using the determination of whether or not the navigation bar is disqualified from being classified as an objectionable navigation bar, wherein the act, for each of the nodes that is determined to correspond to a navigation bar, of determining whether or not the navigation bar is disqualified from being classified as an objectionable navigation bar includes determining, with the machine, whether a disqualification condition, selected from a group of disqualification conditions consisting of (a) if the component associated with the node has less than a predetermined number of anchors, (b) if the component associated with the node has more than a predetermined percentage of words of the document, and (c) if the node has a disqualified ancestor node and that all descendant nodes of the disqualified ancestor node are associated with navigation bar components, exists.

27. An apparatus for detecting navigation bars in a document, the apparatus comprising:
- a) means for segmenting the document into components; and
- b) means for, for each of the components,
    - i) analyzing anchors of the component,
    - ii) analyzing non-anchor text of the component, and
    - iii) re-authoring the component, wherein the act of re-authoring the component is controlled using the analysis of the anchors and the non-anchor-text of the component, wherein the means for re-authoring the component control the re-authoring based on a number of anchors in the component and a number of non-anchor words in the component.

28. An apparatus for detecting objectionable navigation bars in a document, the apparatus comprising:
- a) means for segmenting the document into components;
- b) means for determining, for each of the components, whether or not the component is a navigation bar; and
- c) means for, for each of the components that is determined to be a navigation bar,
    - i) determining whether or not the navigation bar is disqualified from being classified as an objectionable navigation bar, and
    - ii) re-authoring the navigation bar, wherein the re-authoring of the navigation bar is controlled using the determination of whether or not the navigation bar is disqualified from being classified as an objectionable navigation bar, wherein the act, for each of the nodes that is determined to correspond to a navigation bar, of determining whether or not the navigation bar is disqualified from being classified as an objectionable navigation bar includes determining, with the machine, whether a disqualification condition, selected from a group of disqualification conditions consisting of (a) if the component associated with the node has less than a predetermined number of anchors, (b) if the component associated with the node has more than a predetermined percentage of words of the document, and (c) if the node has a disqualified ancestor node and that all descendant nodes of the disqualified ancestor node are associated with navigation bar components, exists.

* * * * *